United States Patent [19]

Kusano et al.

[11] Patent Number: 5,114,577
[45] Date of Patent: May 19, 1992

[54] COMPOSITE SEPARATING AGENT

[75] Inventors: Hiroshi Kusano, Yokohama; Tsuyoshi Ito, Machida; Takayuki Tashiro, Machida; Hiroaki Takayanagi, Machida; Eiji Miyata, Kitakyushu, all of Japan

[73] Assignee: Mitsubishi Kasei Corporation, Japan

[21] Appl. No.: 651,117

[22] Filed: Feb. 5, 1991

Related U.S. Application Data

[63] Continuation of Ser. No. 291,101, Dec. 28, 1988, abandoned.

[30] Foreign Application Priority Data

Dec. 29, 1987 [JP] Japan .................. 62-333023
Apr. 1, 1988 [JP] Japan .................. 63-78229
Apr. 1, 1988 [JP] Japan .................. 63-78230

[51] Int. Cl.$^5$ .................................................. B01D 15/08
[52] U.S. Cl. .......................... 210/198.2; 210/502.1; 210/635; 210/656; 502/402; 502/404
[58] Field of Search ........... 210/635, 656, 658, 198.2, 210/502.1; 502/401, 402, 404

[56] References Cited

U.S. PATENT DOCUMENTS

| | | | |
|---|---|---|---|
| 3,598,245 | 8/1971 | Determann | 210/635 |
| 3,983,053 | 9/1976 | Courtney | 210/635 |
| 4,236,423 | 5/1981 | Rohrback | 502/401 |
| 4,318,819 | 3/1982 | Molloy | 210/659 |
| 4,318,820 | 3/1982 | Malloy | 502/402 |
| 4,335,017 | 6/1982 | Miles | 502/402 |
| 4,336,161 | 6/1982 | Rosevear | 502/402 |
| 4,339,500 | 7/1982 | Yanagihara | 210/635 |
| 4,385,991 | 5/1983 | Rosevear | 210/656 |
| 4,386,006 | 5/1983 | Harrington | 210/681 |
| 4,443,339 | 4/1984 | Rosevear | 210/658 |
| 4,447,328 | 5/1984 | Kamiyama | 210/635 |
| 4,477,492 | 10/1984 | Bergna | 210/656 |
| 4,505,822 | 3/1985 | Blomback | 210/635 |
| 4,544,485 | 10/1985 | Pinkerton | 210/635 |
| 4,565,832 | 1/1986 | Kobashi | 210/635 |
| 4,694,044 | 9/1987 | Kiniwa | 210/635 |
| 4,696,745 | 9/1987 | Itagaki | 210/635 |
| 4,711,863 | 12/1987 | Streat | 210/656 |
| 4,732,887 | 3/1988 | Obanawa | 502/402 |

OTHER PUBLICATIONS

Snyder, Introduction to Modern Liquid Chromatography, John Wiley & Sons, Inc. New York, 1979, pp. 173-174.
Abstract of Japan Patent A-60-96605, May 30, 1985.

Primary Examiner—Ernest G. Therkorn
Attorney, Agent, or Firm—Jordan B. Bierman

[57] ABSTRACT

A composite separating agent which comprises a hydrophilic polymer separating agent showing a degree of swelling in water of 10 to 100 ml/g-dry and having a giant network structure incorporated within pores of an organic polymer substrate showing a degree of swelling in water of 20 ml/g-dry or below and a degree of crosslinking of 4% to 100% by mol and having a porous structure as well as a process for producing the same are disclosed.

When packed within a column, this composite separating agent having a high mechanical strength is hardly compacted and exhibits an excellent separation performance. Thus it is highly useful in chromatographic separation of biopolymers including proteins.

7 Claims, 8 Drawing Sheets

5,114,577

COMPOSITE SEPARATING AGENT

This application is a continuation of application Ser. No. 07/291,101 filed Dec. 28, 1988, now abandoned.

BACKGROUND OF THE INVENTION

1. Field of the Invention

This invention relates to a composite separating agent, which has a high mechanical strength and an excellent permeability of liquids when packed in a column and thus is suitable for chromatographically separating biopolymers such as proteins, as well as a process for producing the same.

2. Prior Art

Separation and purification of biopolymers such as proteins is highly limited by the nature of the materials to be separated, being different from the case of common low molecular weight materials. That is to say, proteins should be separated under mild conditions since they are liable to be denatured or decomposed when exposed to a high temperature, organic solvents, acids or alkalis.

Accordingly, known agents for separating and purifying biopolymers such as proteins fall within the following types:

(1) a separating agent obtained by crosslinking polysaccharides such as agarose or dextran;

(2) a separating agent obtained by crosslinking polyvinyl alcohol with epichlorohydrin;

(3) a separating agent obtained by copolymerizing an acrylate monomer with a crosslinking polyalkylene glycol polyacrylate monomer;

(4) a separating agent obtained by coating the surface of a separating agent (3) with a hydrophilic material; and (5) a separating agent obtained by charging an agarose gel within pores of a porous inorganic kieselguhr carrier.

The above separating agents (1) and (2) are particularly effective in gel filtration chromatography since they are highly hydrophilic, hardly cause irreversible adsorption of proteins and have a giant network structure. However these separating agents are non-rigid and thus inferior in mechanical strength, which brings about a serious disadvantage. That is to say, when one of these separating agents is applied to column separation on an industrial scale to be carried out at a high column height and at a high flow rate, the separating agent would be compacted and thus the liquid permeation becomes impossible.

On the other hand, the separating agent (3) is rigid and thus excellent in mechanical strength. However it involves some hydrophobic portion which would often cause irreversible adsorption of proteins. Further the porous structure thereof brings about a low separation performance, compared with those of the separating agents (1) and (2).

The separating agent (3), wherein the surface of a separating agent is coated with a hydrophilic material, hardly causes irreversible adsorption of proteins and is rigid. Thus it is excellent in mechanical strength. However the porous structure thereof results in a low separation performance, compared with those of the separating agents (1) and (2).

The above separating agent (5), wherein an agarose gel is charged within pores of a porous inorganic kieselguhr carrier, is rigid and has a high mechanical strength. However inorganic porous materials are scarcely resistant against acids and alkalis in general. Thus a separating agent comprising a porous inorganic material is highly restricted at the washing step in the separation. Further it has a poor durability.

SUMMARY OF THE INVENTION

An object of the present invention is to provide a composite separating agent, which carries the excellent separation performance of a hydrophilic polymer separating agent having a macro network structure and comprising, for example, crosslinked dextran or crosslinked agarose and yet sustains a highly improved mechanical strength, compared with that of said hydrophilic polymer separating agent, as well as a process for producing the same.

In order to overcome the abovementioned problems, we have conducted extensive studies. As a result, we have found that the above object can be achieved by charging a hydrophilic polymer separating agent, which is poor in mechanical strength but can effectively separate, for example, proteins, into pores of an organic polymer substrate having a high mechanical strength.

According to the present invention there is to provide a composite separating agent and a process for preparing thereof, comprises a hydrophilic polymer separating agent, which shows a degree of swelling in water of 10 to 100 ml/g-dry and has a macro-network structure, charged within pores of a porous organic polymer substrate having a degree of swelling in water of 20 ml/g-dry or below and a degree of crosslinking of 4 to 100% by mol and having a porous structure.

BRIEF DESCRIPTION OF THE DRAWINGS

FIG. 8 is a sectional schematic representation of the composite separating agent produced by the process (A) while

DETAILED DESCRIPTION OF THE INVENTION

Figure 1:
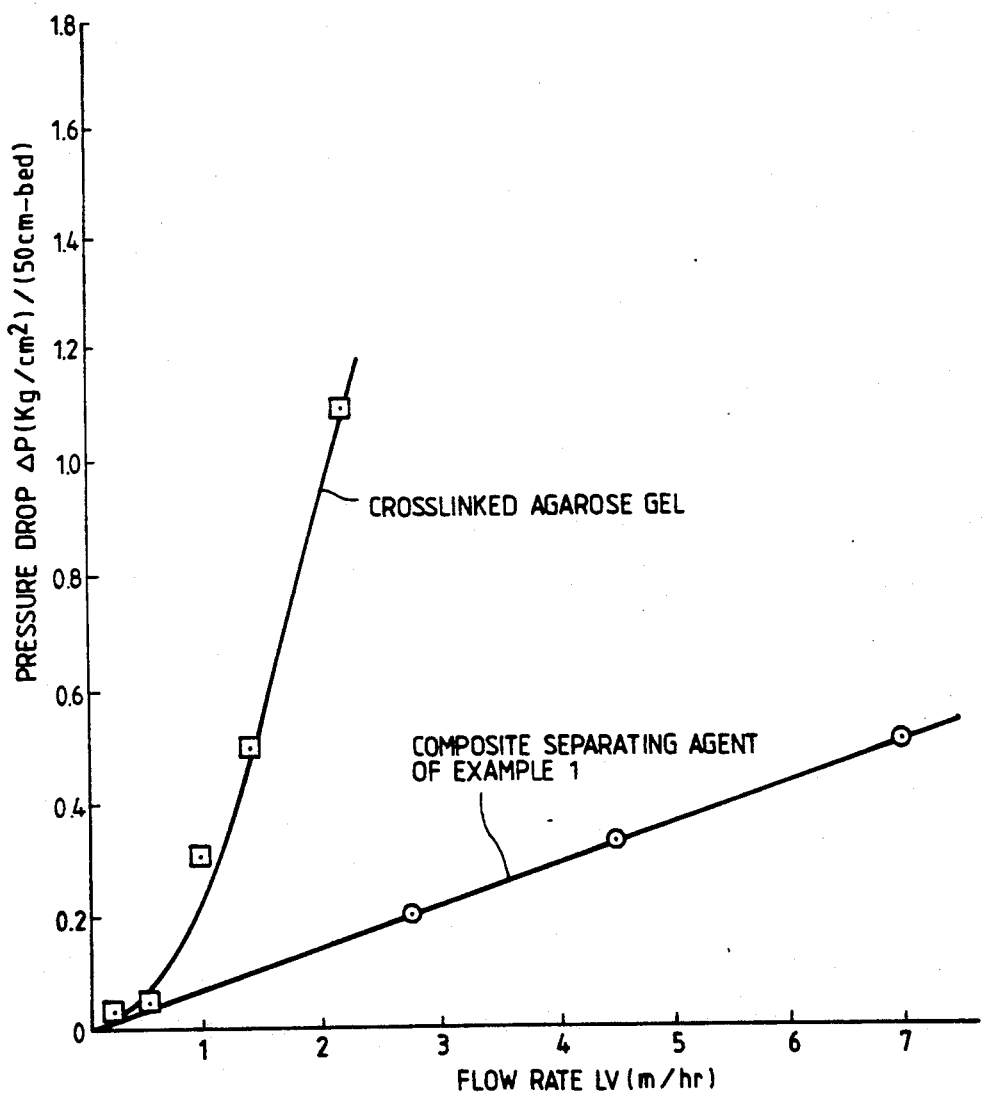
FIG. 1 is a graph showing the relationships between the flow rate LV and pressure drop P observed when the composite separating agent of Example 1 and a crosslinked agarose gel, which is used for comparison, are packed each in a column.

The composite separating agent of the present invention may be readily produced by the following process (A) or (B).

According to the process (A), the composite separating agent of the present invention may be readily produced by charging an uncrosslinked starting hydrophilic polymer solution for a hydrophilic polymer separating agent within pores of an organic polymer substrate which shows a degree of swelling in water of 20 ml/g-dry or below and a degree of crosslinking of 4 to 100% by mol and has a porous structure and subsequently adding a crosslinking agent thereto to thereby crosslink said starting hydrophilic polymer in the pores, thus giving a hydrophilic polymer separating agent which shows a degree of swelling in water of 10 to 100 ml/g-dry and has a macro-network structure.

According to the process (B), on the other hand, the composite separating agent of the present invention may be readily produced by dispersing a particulate hydrophilic polymer separating agent in sphering liquor drops containing a monomer mixture for forming hydrophilic organic polymer particles, which shows a degree of swelling in water of 20 mg/g-dry or below and a degree of crosslinking of 4 to 50% by mol and a porous structure, or a solution of an uncrosslinked starting polymer and subsequently polymerizing said monomer mixture or insolubilizing and crosslinking said starting polymer.

Now the process (A) for producing the composite separating agent will be described in detail.

The organic polymer substrate to be used in the present invention which shows a degree of swelling in water of 20 ml/g-dry or below and a degree of crosslinking of 4 to 100% by mol and has a porous structure, which will be sometimes simply called "porous polymer substrate" hereinafter, should have a degree of swelling in water of 10 ml/g-dry and a degree of crosslinking of 4 to 100% by mol. This is because a degree of swelling exceeding 20 ml/g-dry or a degree of crosslinking less than 4% by mol would lower the mechanical strength of the porous polymer substrate.

The pores of the porous polymer substrate be used in the present invention should have such a volume as allowing to form and charge a sufficient amount of the hydrophilic polymer therein as well as such a pore size as allowing to diffuse the material to be separated, e.g., a protein, therein. However an excessively large pore volume or an excessively large pore size would lower the mechanical strength of the porous polymer substrate. Thus a preferable pore volume ranges from 0.5 to 3 ml/g while a preferable pore radius ranges from 200 to 100,000 Å.

A preferable example of the organic polymer for preparing the porous polymer substrate to be used in the present invention is a copolymer of a monounsaturated monomer carrying a vinyl group or an isopropenyl group in a molecule with a polyunsaturated monomer carrying two or more vinyl groups or isopropenyl groups in a molecule.

Examples of said monounsaturated monomer include aromatic monovinyl compounds such as styrene, ethylvinylbenzene and p-methylstyrene; polymerizable ester or ether compounds carrying a vinyl group or an isopropenyl group and functional group(s) such as glycidyl (meth)acrylate, which involves glycidyl acrylate as well as glycidyl . methacrylate and the same will apply hereinafter, acryl glycidyl ether, 2-hydroxyethyl (meth)acrylate and polyethylene glycol (meth)acrylate; (meth)acrylic acid and (meth)acrylates such as acrylic acid, methacrylic acid, methyl acrylate and methyl methacrylate; and vinyl group-containing carboxylates such as vinyl formate, vinyl acetate, allyl formate and allyl acetate.

Examples of said polyunsaturated monomer, include aromatic polyvinyl compounds such as divinyl benzene, trivinyl benzene and substituted derivatives thereof; alkylene di(meth)acrylates such as ethylene glycol diacrylate, ethylene glycol dimethacrylate and polyethylene glycol dimethacrylate; glycerol poly(meth)acrylates such as glycerol triacrylate and glycerol dimethacrylate; and polyacryl compounds having a hetero ring such as triallyl isocyanurate.

The porous polymer substrate to be used in the present invention may be prepared from the monomer and the polyunsaturated monomer, each as defined above, by a well known method. For example, it can be obtained by the method disclosed in JP-A-60-96605 (the term "JP-A" used herein means unexamined Japanese patent application). Thus the porous polymer substrate to be used in the present invention may be readily prepared according to a known method. For example, the abovementioned monounsaturated monomer is suspension-polymerized with the abovementioned di- or higher polyunsaturated monomer by adding a radical polymerization initiator in the presence of a poromerizing agent in water. Then the poromerizing agent is removed to thereby give the porous polymer substrate to be used in the present invention.

Some porous polymer substrate satisfying the requirements for the porous polymer substrates to be used in the present invention are commercially available as an ion exchange resin or an adsorbing agent. Therefore the present invention may be conducted by using these commercially available porous polymer substrates.

The composite separating agent of the present invention may be produced by charging the abovementioned hydrophilic polymer separating agent, which shows a degree of swelling in water of 10 to 100 ml/g-dry and has a macro-network structure, into the pores of the abovementioned porous polymer substrate by various methods. Among these methods, it is the most convenient and preferable, as described above, to charge a solution of the uncrosslinked starting hydrophilic polymer into the pores of the porous polymer substrate satisfying the requirements for the porous polymer substrate to be used in the present and then adding a crosslinking agent thereto to thereby crosslink said starting hydrophilic polymer within the pores, thus forming the hydrophilic polymer separating agent satisfying the requirements specified in the present invention.

Examples of the uncrosslinked hydrophilic polymer available in the preparation of the hydrophilic polymer separating agent, namely the starting hydrophilic polymer, include polysaccharides such as dextran, agarose and chitosan as well as synthetic hydrophilic polymers such as polyvinyl alcohol and polyacrylamide.

Any solvent may be used to give a solution of the starting hydrophilic polymer, so long as the starting hydrophilic polymer is soluble therein. Water is the most commonly employed therefor. The concentration of the starting hydrophilic polymer to be dissolved in water may be appropriately determined depending on, for example, the performance of the separating agent to be produced. It generally ranges from 2 to 50% by weight, preferably 5 to 20% by weight.

Generally speaking, a hydrophilic polymer separating agent having a high degree of swelling may be obtained from a starting hydrophilic polymer solution of a low concentration while a hydrophilic polymer separating agent of a low degree of swelling may be obtained from that of a high concentration.

The solution of the starting hydrophilic polymer thus formed is then charged into the pores of a porous polymer substrate. The charging may be carried out by various methods. In general, it is the most convenient to impregnate the porous polymer substrate with the starting hydrophilic polymer solution.

The starting hydrophilic polymer solution thus charged into the pores of the porous polymer substrate is then crosslinked in the pores by adding a crosslinking agent thereto. Thus a hydrophilic polymer separating agent can be formed. Examples of the crosslinking agent include compounds having two or more functional groups active for an OH group, for example, epihalohydrins such as epichlorohydrin, dialdehydes such as glutaraldehyde and diisocyanates such as methylene diisocyanate. When an amino group-containing compound such as chitosan is to be used as the starting hydrophilic polymer, it is also possible to use a dihalide such as 1,8-dichlorooctane as the crosslinking agent.

The crosslinking reaction with the use of such a crosslinking agent may be usually carried out by dispersing or suspending the starting hydrophilic polymer solution charged in the pores of the porous polymer substrate in an appropriate medium. The amount of the crosslinking agent to be added may be appropriately determined depending on, for example, the properties of the aimed separating agent. Generally speaking, the degree of swelling of the resulting hydrophilic polymer separating agent would decrease with an increase in the amount of the crosslinking agent, and the converse is also true. When an excessively large amount of the crosslinking agent is added, the properties of the starting hydrophilic polymer would be damaged. Thus the crosslinking agent may be usually added in an amount of 0.1 to 2 mol per mol of the constituting unit of the starting hydrophilic polymer.

When the crosslinking reaction between the crosslinking agent and the starting hydrophilic polymer can be controlled by, for example, adding a catalyst, the crosslinking reaction may be carried out by adding said catalyst to a system wherein the porous polymer substrate preliminarily impregnated with the starting hydrophilic polymer solution is dispersed or suspended. When the crosslinking reaction can be induced by varying some reaction conditions such as concentration, the crosslinking reaction may be carried out by dispersing or suspending the porous polymer substrate impregnated with a solution containing the starting hydrophilic polymer, the crosslinking agent and the catalyst in an appropriate medium and then adjusting the reaction conditions such as concentration to thereby effectively proceed the crosslinking reaction.

The crosslinking catalyst varies depending on the crosslinking agent to be employed. For example, when epichlorohydrin is selected as the crosslinking agent, an alkali such as sodium hydroxide or potassium hydroxide may be preferably used as the catalyst. When a dialdehyde compound is selected as the crosslinking agent, a mineral acid such as hydrochloric acid or sulfuric acid may be preferably used therefor.

Any medium may be used for dispersing or suspending the porous polymer substrate impregnated with the starting hydrophilic polymer solution therein, so long as it does not extract the starting hydrophilic polymer from the impregnating solution and is inert in the crosslinking reaction. Examples of the medium include organic solvents such as toluene, dichlorobenzene and nitromethane. When a hydrophobic polymer substrate is to be used as the porous polymer substrate, an aqueous medium may be selected therefor. The suspension medium may be used in an amount 2 times by volume or more, preferably 3 to 6 times by volume, as much as that of the organic polymer substrate. When an organic solvent is to be used as the suspension medium, it is preferable to add an oil-soluble dispersion stabilizer thereto to thereby stabilize the dispersion. Examples of said dispersion stabilizer include oil-soluble cellulose derivatives such as ethyl cellulose, cellulose acetate butyrate and ethyl hydroxyethyl cellulose, gum arabic, sorbitan sesquioleate, sorbitan monooleate and sorbitan monostearate. The dispersion stabilizer may be usually added in an amount of 0.05 to 10% by weight, preferably 0.1 to 5% by weight, based on the organic solvent.

The crosslinking reaction is usually carried out at 5° to 90° C. for one to ten hours.

This crosslinking reaction is to be carried out to give a hydrophilic polymer separating agent showing a degree of swelling in water of 10 to 100 ml/g-dry, preferably 10 to 50 ml/g-dry. As described above, the aimed degree of swelling may be readily achieved by appropriately controlling the concentration of the starting hydrophilic polymer solution or the amount of the crosslinking agent. It is known that the hydrophilic polymer separating agent thus obtained by crosslinking the starting hydrophilic polymer solution usually has a macro-network structure.

After the completion of the crosslinking reaction, the separating agent thus obtained is filtered and then washed with a hydrophilic organic solvent such as methanol or ethanol to thereby remove, for example, the unreacted starting hydrophilic polymer and the suspension medium. Thus the composite separating agent of the present invention wherein the hydrophilic polymer separating agent is charged within pores of the porous polymer substrate is obtained.

From the viewpoint of the separating performance, the higher content of the hydrophilic polymer separating agent in the porous polymer substrate is the more preferable. However it is known that the mechanical strength of the separating agent would decrease with an increase in the above content. Thus it is preferable that the ratio by volume of the porous polymer substrate and the hydrophilic polymer separating agent falls within a range of 1:0.5 to 1:3.

The degree of crosslinking of the copolymer of the monounsaturated monomer and the polyunsaturated polymer is expressed in the ratio by weight calculated according to the following equation.

$$\text{Degree of crosslinking \%} = \frac{(\text{Wt. of polyunsaturated monomer})}{\left(\begin{array}{c}\text{Wt. of monounsaturated monomer} + \\ \text{Wt. of polyunsaturated monomer}\end{array}\right)} \times 100$$

Now the process (B) for producing the composite separating agent of the present invention will be described in detail.

It is preferable that the composite separating agent of the present invention which is in the form of a particulate hydrophilic polymer separating agent showing a degree of swelling in water of 10 to 100 ml/g-dry and having a macro-network structure, which will be sometimes called "the particulate hydrophilic polymer separating agent having a macro-network structure" hereinafter, has a particle size of 5 to, 500μ. On the other hand, it is preferable that the composite separating agent of the present invention which is in the form of hydrophilic organic polymer particles showing a degree of swelling in water of 20 ml/g-dry or below and a degree of crosslinking of 4 to 50% by mol and having a porous structure, which will be sometimes called "the hydrophilic organic polymer particles having a porous structure", has a particle size of 20 to 1000 microns and a pore radius of 100 microns or above which allows the free diffusion of the biopolymer to be separated, e.g., a protein therein.

Generally speaking, the separation performance of the particulate hydrophilic polymer separating agent having a macro-network structure would increase with a decrease in the particle size of the same. However it is required that the particle size thereof is larger than the pore radius of the hydrophilic organic polymer particles having a porous structure.

In the composite separating agent of the present invention, it is preferable that the content of the particulate hydrophilic polymer separating agent having a macro-network structure amounts to 40 to 80% by volume based on the total composite separating agent.

Preferable examples of the starting hydrophilic polymer for preparing the particulate hydrophilic polymer separating agent having a macro-network structure to be used in the composite separating agent of the present invention are polysaccharides such as dextran or agarose. The starting hydrophilic polymer may be dissolved in an appropriate solvent to thereby form spheres. Then it is crosslinked to thereby give a particulate hydrophilic polymer separating agent having a giant network structure which is then used in the production of the composite separating agent of the present invention.

Any solvent may be used in the above step so long as the starting hydrophilic polymer is soluble therein. Water is the most commonly employed therefor. The concentration of the hydrophilic polymer dissolved in the solvent may be appropriately selected depending on, for example, the performance of the aimed separating agent. The concentration usually ranges from 2 to 50% by weight, preferably 5 to 20% by weight. Generally speaking, a particulate hydrophilic polymer separating agent having a high degree of swelling may be obtained from a starting hydrophilic polymer solution of a low concentration while that of a low degree of swelling may be obtained from a starting hydrophilic polymer solution of a high concentration.

A crosslinking agent and a catalyst are added to the solution of the starting hydrophilic polymer. The resulting solution is dispersed in an organic solvent to thereby form spheres followed by crosslinking.

As the crosslinking agent, a compound capable of forming a crosslinked moiety having two or more carbon atoms between the main polymer chains of the starting hydrophilic polymer is preferably employed. Examples thereof include dialdehyde compounds such as glutaraldehyde and terephthalaldehyde; and epihalohydrins such as epichlorohydrin and epibromohydrin. The amount of the crosslinking agent may vary depending on the degree of swelling of the aimed separating agent. It is usually added in an amount of 0.1 mol or above per mol of the constituting unit of the starting hydrophilic polymer. The degree of swelling of the resulting separating agent is to be controlled to 10 to 100 ml/g-dry, preferably 10 to 50 ml/g-dry. by adjusting the concentration of the starting hydrophilic polymer solution and the amount of the crosslinking agent.

When the crosslinking reaction between the crosslinking agent and the hydrophilic polymer can be controlled by, for example, adding a catalyst, the crosslinking reaction may be carried out by adding said catalyst to a system wherein the starting hydrophilic polymer solution containing the crosslinking agent is dispersed in an appropriate organic solvent and formed into spheres therein. When the crosslinking reaction can be induced by varying reaction conditions such as concentration. the crosslinking reaction may be carried out by dispersing a solution containing the starting hydrophilic polymer, the crosslinking agent and the catalyst in an appropriate organic solvent and then adjusting the reaction conditions such as concentration to thereby effectively conduct the crosslinking reaction.

In the crosslinking reaction, a catalyst selected from among acids such as hydrochloric acid or sulfuric acid or alkalis such as sodium hydroxide or potassium hydroxide may be used depending on the crosslinking agent to be used. The dispersion and granulation may be carried out by adding a solution, obtained by dissolving the starting hydrophilic polymer in a solvent (commonly water) and adding the crosslinking agent and the catalyst thereto, to an organic solvent; and stirring the resulting solution at 0° to 30° C. for 5 to 60 minutes. It is to be noted here that an excessively high temperature would undesirably induce the crosslinking reaction prior to the formation of excellent spherical liquid drops.

Examples of the organic solvent to be used for the dispersion and granulation include aromatic hydrocarbons and halide derivatives thereof such as toluene, benzene, chlorobenzene and diclorobenzene; and aliphatic and cycloaliphatic hydrocarbons and halide derivatives thereof such as n-heptane, n-hexane, liquid paraffin, cyclohexane, dichloromethane and dichloroethane. One of these solvents is usually employed alone, though a mixture thereof may be used therefor.

The organic solvent is employed in an amount two times by volume or above, preferably three to six times by volume, as much as the starting hydrophilic polymer solution. It is preferable to add an oil-soluble disperiodsn stabilizer such as oil-soluble cellulose derivatives such as ethyl cellulose, cellulose aceate butyrate or ethyl hydroxyethyl cellulose; gum arabic, sorbitan sesquioleate, sorbitan monooleate or sorbitan monostearate. The dispersion stabilizer is usually added in an amount of 0.05 to 10% by weight, preferably 0.1 to 5% by weight, based on the organic solvent.

Following the dispersion and granulation, the crosslinking reaction may be carried out at 0° to 100° C., preferably 30° to 80° C. for 1 to 20 hours, preferably for 2 to 8 hours.

After the completion of the crosslinking reaction, the obtained hydrophilic polymer particles are filtered off and washed with an organic solvent such as acetone or methanol and then thoroughly with water. Thus a separating agent, which shows a degree of swelling in water of 10 to 100 ml/g-dry and has a macro-network structure, namely, the particulate hydrophilic polymer separating agent having a giant network structure according to the present invention, is obtained. There are marketed some particulate hydrophilic polymer separating agents having a macro-network structure of the above-mentioned type on various tradenames. Accordingly the composite separating agent of the present invention may be produced by using one of these commercially available particulate hydrophilic polymer separating agents.

The composite separating agent of the present invention may be obtained by incorporating the abovementioned particulate hydrophilic polymer separating agent having a macro-network structure into a hydrophilic organic polymer particles having a porous structure. As a hydrophilic organic polymer for preparing the above hydrophilic organic polymer particles having a porous structure, those which hardly cause the irreversible adsorption of biopolymers such as a protein are to be used. Examples thereof include (i) a copolymer consisting of a crosslinking monomer comprising alkylene di(meth)acrylate and/or glycerol poly(meth)acrylate and a main-chain constituting monomer comprising a polymerizable ester and/or ether carrying a vinyl group or an isopropenyl group and a functional group; (ii) crosslinked chitosan; and (iii) crosslinked polyvinyl alcohol.

The term "(meth)acrylate" as used herein involves acrylate and methacrylate.

The hydrophilic organic polymer particles having a porous structure to be used in the present invention have a degree of swelling in water of 20 ml/g-dry or below and a degree of crosslinking of 4 to 50% by mol and has a porous structure. When the degree of swelling exceeds 20 ml/g-dry, the mechanical strength of the particles would be lowered. When the degree of crosslinking thereof exceeds 50% by mol, the hydrophilic properties of the polymer are damaged, which causes the irreversible adsorption of a protein. When the degree of crosslinking is lower than 4% by mol, on the other hand, the mechanical strength of the particles would be lowered. These polymer particles should have a pore size which allows the free diffusion of a biopolymer such as a protein, namely, having a radius of at least 100 Å.

Now a process for producing the composite separating agent of the present invention with the use of the abovementioned copolymer (i) will be described in detail. As the alkylene di(meth)acrylate crosslinking monomer, an acrylate or a methacrylate of an alkylene glycol carrying two or three carbon atoms or a polyalkylene glycol of a degree of polymerization of 4 or below is preferable. Examples thereof include ethylene glycol diacrylate, ethylene glycol dimethacrylate, propylene glycol diacrylate, propylene glycol dimethacrylate, polyethylene glycol dimethacrylate and polypropylene glycol dimethacrylate. Among these compounds, ethylene glycol di(meth)acrylate is particularly preferable.

Examples of the glycerol poly(meth)acrylate crosslinking monomer include glycerol triacrylate and glycerol dimethacrylate.

As the polymerizable ester or ether carrying a polymerizable vinyl group or isopropenyl group and a functional group, which is to be employed as the main chain constituting monomer, glycidyl diester of a carboxylic acid having one polymerizable vinyl group or isopropenyl group and preferably carrying 3 to 12 carbon atoms, a hydroxyalkyl ester of said carboxylic acid or an alkenyl (preferably carrying 3 to 12 carbon atoms) glycidyl ether carrying one polymerizable vinyl group or an isopropenyl group may be used. Examples thereof include glycidyl (meth)acrylate, allyl glycidyl ether, 2-hydroxyethyl(meth)acrylate, and polyethylene glycol mono(meth)acrylate.

A typical process for producing the composite separating agent of the present invention with the use of the abovementioned crosslinking monomer and main-chain constituting monomer comprises: dispersing the particulate hydrophilic polymer separating agent having a macro-network structure as obtained above in a mixture comprising said crosslinking monomer and said main-chain constituting monomer at an appropriate ratio; adding an organic diluent thereto as a poromerizing agent for the resulting dispersion; dispersing the obtained mixture in an aqueous medium to thereby granulate the same into spheres; and then suspension-polymerizing these oil drop spheres in said aqueous medium. Namely, the particulate hydrophilic polymer separating agent as prepared above or a commercially available one is added to a mixture of the abovementioned crosslinking monomer and the main-chain constituting monomer, wherein said crosslinking monomer content amounts to 4 to 50%. Then an appropriate amount of an organic diluent is further added thereto as a poromerizing agent. The resulting mixture is added to an aqueous medium containing an appropriate emulsifier and an initiator and stirred to thereby form spheres of an oil drop-in-water type dispersion. Then it is heated to an appropriate temperature to thereby suspension-polymerizing these oil drop spheres. Thus the composite separating agent of the present invention, wherein plural hydrophilic polymer separating agent particles are incorporated into each pore of the hydrophilic organic polymer particles having a porous structure, is obtained.

Any organic diluent may be used as a poromerizing agent, so long as it is inert to the abovementioned functional groups such as glycidyl and hydroxyl groups. Examples thereof include benzene, toluene, ethyl benzene, chlorobenzene, n-octane, dichloroethane, cyclohexanol, n-octyl alcohol, n-dodecyl alcohol, dibutyl ether, diamyl ether, propyl acetate, butyl acetate, cyclohexanone and methyl isobutyl ketone. Either one of these diluents or a mixture thereof may be used. The organic diluent may be usually used in an amount 0.05 to 3 times by weight based on the total monomers.

Examples of the initiator include benzoyl peroxide, dilauroyl peroxide and azobisisobutyronitrile. It is usually used in an amount of 0.01 to 10% by weight based on the total monomers.

After the completion of the suspension-polymerization, the separating agent thus formed is filtered off and washed with an organic solvent such as acetone or methanol followed by thoroughly washing with water. Thus the composite separating agent of the present invention is obtained.

Alternately the composite separating agent of the present invention may be produced by using chitosan as the starting hydrophilic polymer for preparing the hydrophilic organic polymer particles.

The particulate hydrophilic polymer separating agent as obtained above or a commercially available one is allowed to swell in water and then dispersed in an acidic aqueous solution of chitosan. The obtained mixture is stirred in a dispersion bath comprising an organic solvent to thereby disperse the hydrophilic polymer separating agent and to granulate the same into spheres. Subsequently the dispersion bath is neutralized by adding a basic material thereto to thereby insolubilize the chitosan. Further a crosslinking agent is added thereto to thereby induce a crosslinking reaction. Thus a composite separating agent of the present invention, wherein plural hydrophilic polymer separating agent particles are incorporated into each pore of the crosslinked chitosan polymer particles having a porous structure, is obtained.

The reason why the insolubilized chitosan polymer particles have a porous structure has not been clarified so far. It is assumed that the neutralization of the chitosan would cause the precipitation of insoluble matters and thus induce phase separation and that then the structure of the polymer would become heterogenous accompanied by the formation of a number of pores.

Examples of the organic solvent to be used in the dispersion bath include aromatic hydrocarbons and halides thereof such as toluene, benzene, chlorobenzene and dichlorobenzene; and aliphatic hydrocarbons, cycloaliphatic hydrocarbons and halides thereof such as n-heptane, n-hexane, liquid paraffin, cyclohexane, dichloromethane and dichloroethane. One of these organic solvents is usually employed alone, though a mixture thereof may be employed therefor. The organic solvent may be used in an amount 2 times by volume or above, preferably two to 6 times by volume, as much as the aqueous solution of chitosan.

It is preferable to add a dispersion stabilizer to the organic solvent for the dispersion bath. Examples of the dispersion stabilizer include oil-soluble cellulose derivatives such as ethyl cellulose, cellulose acetate butyrate and ethyl hydroxyethyl cellulose; gum arabic, sorbitan sesquioleate, sorbitan monooleate and sorbitan monostearate. The dispersion stabilizer may be usually used in an amount of 0.05 to 10% by weight, preferably 0.1 to 5% by weight, based on the organic solvent.

The chitosan may be insolubilized by neutralizing the aqueous acid solution of chitosan after the dispersion and the formation of spheres by adding a basic material thereto. Examples of the basic material include sodium hydroxide, potassium hydroxide, sodium carbonate, ammonia and ethylenediamine.

After insolubilizing the chitosan, a crosslinking agent is added to thereby induce a crosslinking reaction. The crosslinking agent is a compound capable of forming a crosslinking moiety having two or more carbon atoms among the chitosan main chains. Examples thereof include dialdehyde compounds such as glyoxal, glutaraldehyde and terephthalaldehyde; diepoxy compounds such as 1,2,3,4-diepoxybutane; glycidyl ether compounds such as ethylene glycol diglycidyl ether and 1,4-butanediol diglycidyl ether; epihalohydrin compounds such as epichlorohydrin and epi-bromohydrin; and di-isocyanate compounds such as hexamethylene diisocyanate and 1,4-cyclohexane diisocyanate. The crosslinking agent may be usually used in an amount of 4% by mol or above based on the glucosamine residue of the chitosan.

The crosslinking reaction may be carried out by adding the crosslinking agent to the suspension, which has been insolubilized, at 0° to 100° C., preferably 30° to 80° C., for 1 to 20 hours, preferably 2 to 8 hours. A catalyst, for example, an acid such as hydrochloric acid or sulfuric acid or an alkali such as sodium hydroxide or potassium hydroxide may be added to the crosslinking reaction system, if required.

The crosslinked separating agent thus formed is then filtered and washed with an organic solvent such as acetone or methanol followed by thoroughly washing with water. Thus the composite separating agent of the present invention is obtained.

Alternately the composite separating agent of the present invention may be produced by using polyvinyl alcohol as the starting hydrophilic polymer for preparing the hydrophilic organic polymer particles having a porous structure.

Namely, the composite separating agent of the present invention may be readily produced by allowing the particulate hydrophilic polymer separating agent having a macro-network structure as prepared above or a commercially available one to swell in water; dispersing the swelling hydrophilic polymer separating agent in an aqueous solution of polyvinyl alcohol containing salt(s); formulating the resulting dispersion into spheres in a dispersion bath comprising an organic solvent; insolubilizing the spherical drops by taking advantage the spontaneous gelation of the aqueous solution of polyvinyl alcohol; and then crosslinking the same with the use of a crosslinking agent.

The composite separating agent as prepared by this process should have a pore size which allows a biopolymer such as a protein to freely diffuse therein. This may be readily achieved by the spontaneous gelation of the aqueous solution of polyvinyl alcohol.

Namely, the spontaneous gelation of the aqueous solution of polyvinyl alcohol means the insolubilization of the aqueous solution of polyvinyl alcohol without using any third component such as a crosslinking agent. It has been known for a long time that polyvinyl alcohol would show an increase in viscosity with the lapse of time and finally set to gel, when allowed to stand. This phenomenon might be caused by the hydrogen linkage among polyvinyl alcohol molecules. Thus the gelation rate increases with an increase in the concentration of the aqueous solution of polyvinyl alcohol and with a decrease in the temperature at which it is allowed to stand. The reason why the gel obtained by taking advantage of the abovementioned spontaneous gelation has a porous structure has not been clarified so far. It is assumed that the polyvinyl alcohol gel formed by the spontaneous gelation would be precipitated in the medium to thereby induce phase separation and thus the structure of the gel would become heterogeneous accompanied by the formation of a number of pores.

In the above process, the particulate hydrophilic polymer separating agent having a macro-network structure may be allowed to swell in water and then added and dispersed in the aqueous solution of polyvinyl alcohol containing salt(s). Alternately, the particulate hydrophilic polymer separating agent having a macro-network structure may be added to the aqueous solution of polyvinyl alcohol containing salt(s) and then allowed to swell therein. Subsequently the aqueous solution of polyvinyl alcohol, in which said separating agent is dispersed, is added to a dispersion bath comprising an appropriate organic solvent and dispersed therein to thereby form spheres. Then the spherical drops thus formed are allowed to set to gel and thus insolubilized through the spontaneous gelation of the polyvinyl alcohol aqueous solution. The gel thus obtained has a porous structure.

As the organic solvent to be used in the dispersion and formation of spheres, the same one as that employed in the dispersion bath using chitosan for producing the composite separating agent of the present invention may be selected.

The polyvinyl alcohol may have a degree of polymerization of several tens to several thousands, preferably 200 to 2000, and a degree of saponification of 90% by mol or above, preferably 95% by mol or above. The aqueous solution of polyvinyl alcohol would spontaneously set to gel at a concentration of 2 to 30% by weight, preferably 5 to 15% by weight. Since the spontaneous gelation requires a prolonged period of time as such, salt(s) are added thereto in order to accelerate the same. Preferable examples of the salts include sodium chloride and sodium sulfate capable of precipitating or condensing the polyvinyl alcohol.

The amount of the salt(s) may vary depending on the salt(s) to be added. They are usually added in such an amount as to give a concentration in the aqueous solution of polyvinyl alcohol of 3% by weight or above but not to precipitate the polyvinyl alcohol. When sodium chloride is to be added, the amount of the same may vary depending on the degree of polymerization and the degree of saponification of the polyvinyl alcohol as well as the concentration of the aqueous solution. In the case of a 10% by weight aqueous solution of polyvinyl alcohol having a degree of polymerization of 500 and the degree of saponification of 98% by mol or above, for example, sodium chloride may be added to give a sodium chloride concentration of 1 to 12% by weight, preferably 3 to 10% by weight in the aqueous solution of polyvinyl alcohol. In the case of a 5% by weight of aqueous solution, sodium chloride may be added to give a concentration of 1 to 15% by weight, preferably 5 to 13% by weight.

Basic material(s) such as sodium hydroxide may be further added to the aqueous solution containing the salt(s) in order to accelerate the spontaneous gelation.

As described above, the spontaneous gelation may be effected after dispersing the aqueous solution of polyvinyl alcohol containing the particulate hydrophilic polymer separating agent having a macro-network structure which has been allowed to swell in water, and salt(s) in the dispersion bath to thereby form spheres. The spontaneous gelation may be carried out at 0° to 50° C., preferably 3° to 30° C., for 2 to 200 hours, preferably 5 to 100 hours. Thus a polyvinyl alcohol particulate gel having a porous structure, wherein several particles of the particulate hydrophilic polymer separating agent having a macro-network structure are incorporated in each pore, can be obtained.

Then the particulate gel is crosslinked by using a crosslinking agent capable of forming a crosslinked moiety carrying two or more carbon atoms among the main chains of polyvinyl alcohol. Examples of the crosslinking agent include dialdehyde compounds such as glyoxal, glutaraldehyde and terephthalaldehyde; diepoxy compounds such as 1,2,3,4-diepoxybutane; diglycidyl ether compounds such as ethylene glycol diglycidyl ether and 1,4-butanediol diglycidyl ether; epihalohydrin compounds such as epichlorohydrin and epibromohydrin; and diisocyanate compounds such as hexamethylene diisocyanate and 1,4-cyclohexane diisocyanate. The crosslinking agent may be usually used in an amount of 4% by mol or above based on the total hydroxyl groups in the polyvinyl alcohol.

The crosslinking reaction may be conducted by adding the crosslinking agent to the organic solvent bath after the completion of the spontaneous gelation. Alternately it may be conducted by once separating the spheres formed by the spontaneous gelation from the organic solvent by filtering; washing the spheres with an organic solvent such as acetone or methanol; adding the spheres in water; and then adding the crosslinking agent to the water. The crosslinking reaction may be carried out at 0° to 100° C., preferably 30° to 80° C. for 1 to 20 hours, preferably 2 to 8 hours. A catalyst, for example, an acid such as hydrochloric acid or sulfuric acid or an alkali such as sodium hydroxide or potassium hydroxide may be added to the crosslinking reaction system. The catalyst may be selected depending on the crosslinking agent to be used. When a dialdehyde compound is to be used as the crosslinking agent, for example, an acid may be added as a catalyst in such an amount as to lower the acid concentration in the aqueous phase to 0.1N or below. This is because an acid concentration exceeding 0.1N might cause the cleavage of the glycoside bond of a dextran hydrophilic polymer separating agent to thereby decompose the gel. When an epihalohydrin compound is to be used as the crosslinking agent, an alkali may be added as a catalyst in such an amount as to give an alkali concentration in the aqueous phase of 2N or above. This is because an alkali concentration less than 2N might lower the reactivity of epichlorohydrin.

It is preferable to effect the crosslinking reaction by adding salt such as sodium sulfate or sodium chloride or an aqueous solution thereto to the reaction system. It also applies to the crosslinking reaction to be carried out in water. The salt may be usually added in such an amount as to give a concentration in the aqueous phase of 6% by weight or above and to precipitate the polyvinyl alcohol, though it may vary depending on the type of the salt. For example, sodium chloride may be added in an amount of 20% by weight or above, while sodium sulfate may be added in an amount of 6% by weight or above.

After the completion of the crosslinking reaction, the particles are filtered off and washed with an organic solvent such as acetone or methanol followed by throughly washing with water. Thus the composite separating agent of the present invention is obtained.

The organic solvent remaining in the composite separating agent thus formed is completely removed through azeotrope by heating the filtered separating agent in water to thereby distill off the organic solvent.

The composite separating agent of the present invention thus obtained shows an overall particle size of 20 to 10000 μm and has a structure wherein a particulate hydrophilic polymer separating agent, having a particle size of 5 to 500 μm, a macro-network structure and a degree of swelling in water of 10 to 100 ml/g-dry, is incorporated in hydrophilic organic polymer particles showing a degree of swelling in water of 20 ml/g-dry or below, a degree of crosslinking of 4 to 5% by mol and having a porous structure. The content of the particulate hydrophilic polymer separating agent having a macro-network structure in the total composite separating agent amount to 40 to 80% by volume. This composite separating agent, wherein a particulate hydrophilic polymer separating agent having a macro-network structure scarcely causing the irreversible adsorption of biopolymers such as proteins is incorporated in hydrophilic organic polymer particles having a high mechanical strength and a porous structure, has a high mechanical strength. Therefore it is hardly compacted and shows an excellent liquid permeability, even if packed in a long column. Further the composite separating agent exhibits an excellent separation performance when applied to chromatography, in particular, aqueous gel permeation chromatography of biopolymers including various proteins such as γ-globulin, albumin and myoglobin, since the particulate hydrophilic polymer separating agent having a macro-network structure, which is incorporated in the hydrophilic organic polymer particles having porous structure in which biopolymers such as proteins can be freely diffused, would scarcely cause the irreversible adsorption of biopolymers such as proteins.

The degree of crosslinking of the hydrophilic organic polymer particles having a porous structure may be roughly classified into two types depending on the hydrophilic organic polymer to be used.

Namely, the degree of crosslinking of a copolymer comprising a polyunsaturated monomer and a monounsaturated constituting monomer is a ratio by weight calculated according to the following equation:

$$\text{Degree of crosslinking \%} = \frac{(\text{Wt. of polyunsaturated monomer})}{\left(\begin{array}{c}\text{Wt. of monounsaturated constituting monomer} + \\ \text{Wt. of polyunsaturated monomer}\end{array}\right)} \times 100$$

Figure 6:
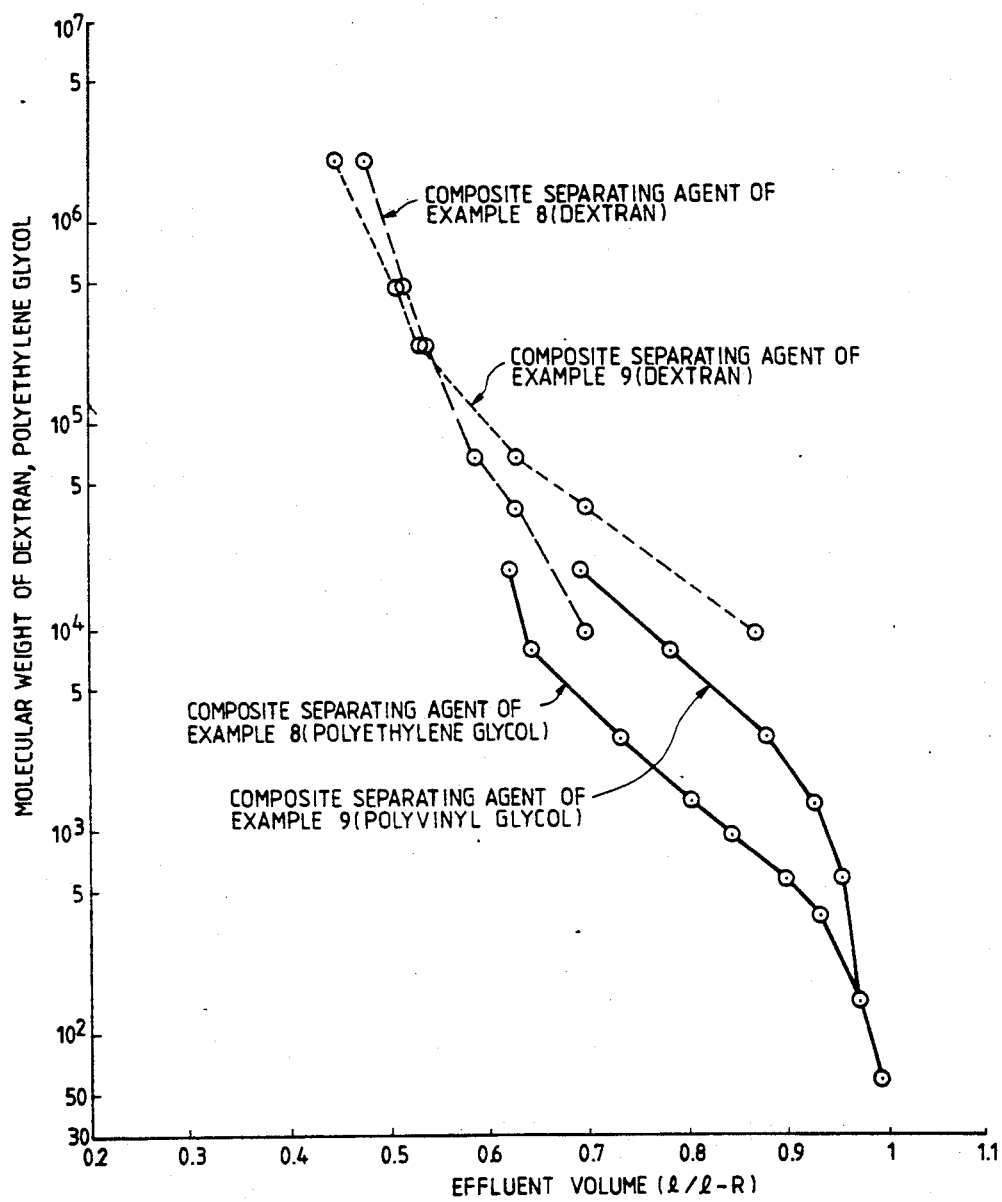
FIG. 6 shows calibration curves of dextran and polyethylene glycol for the composite separating agents of Examples 8 and 9.
Figure 7:
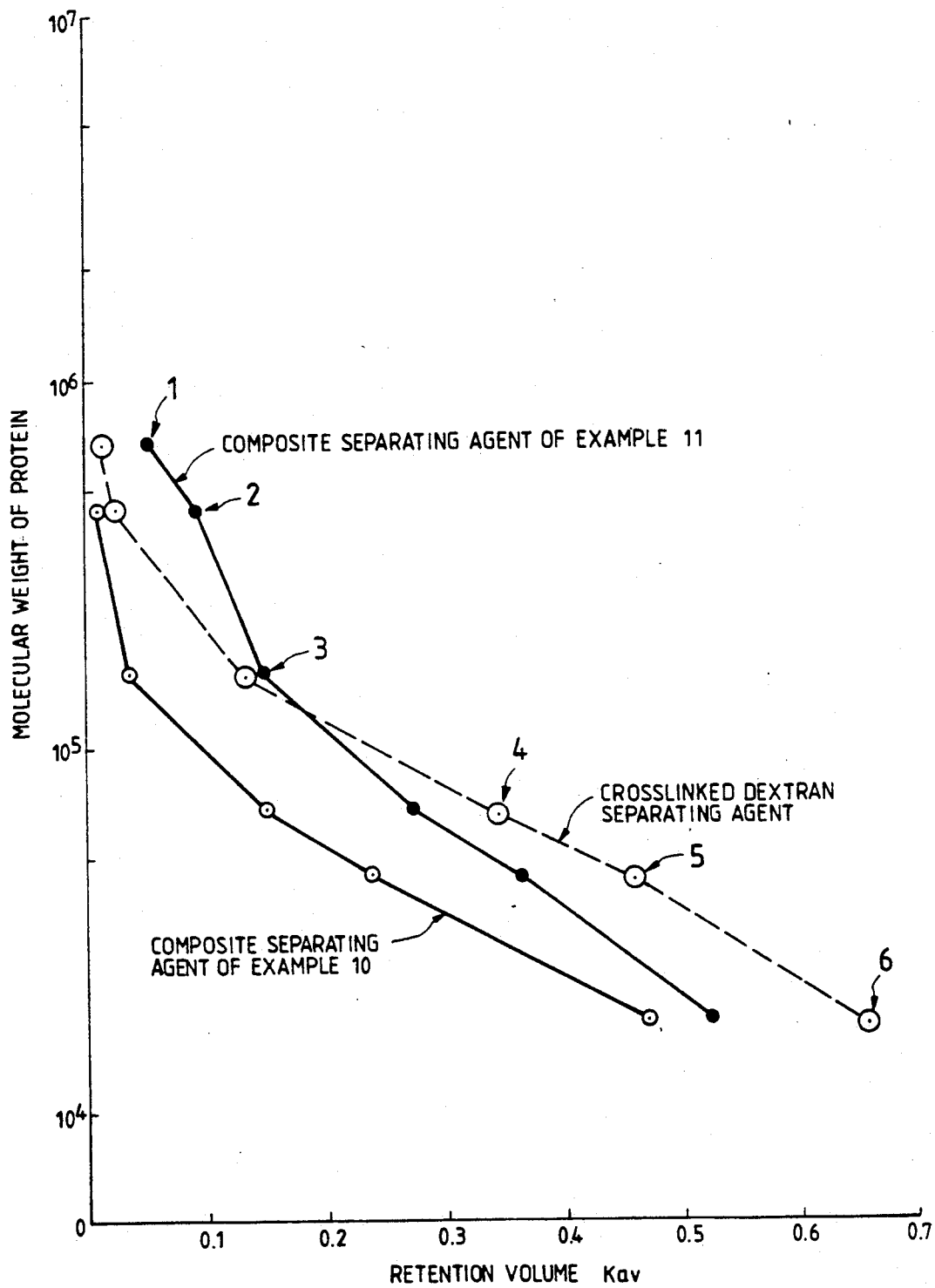
FIG. 7 shows calibration curves of protein for the composite separating agent of Examples 10 and 11 and a crosslinked dextran separating agent which is employed for comparison.
Figure 8:
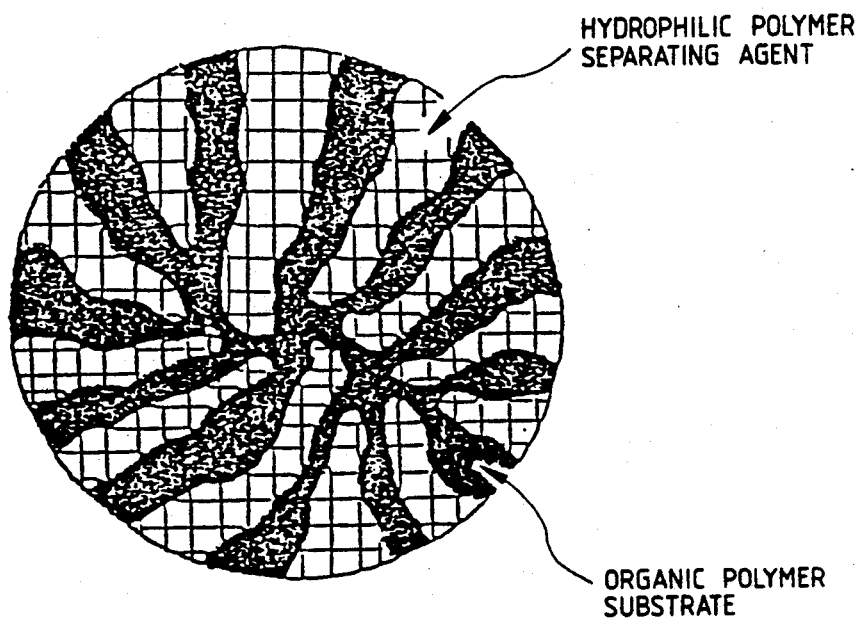
Figure 9:
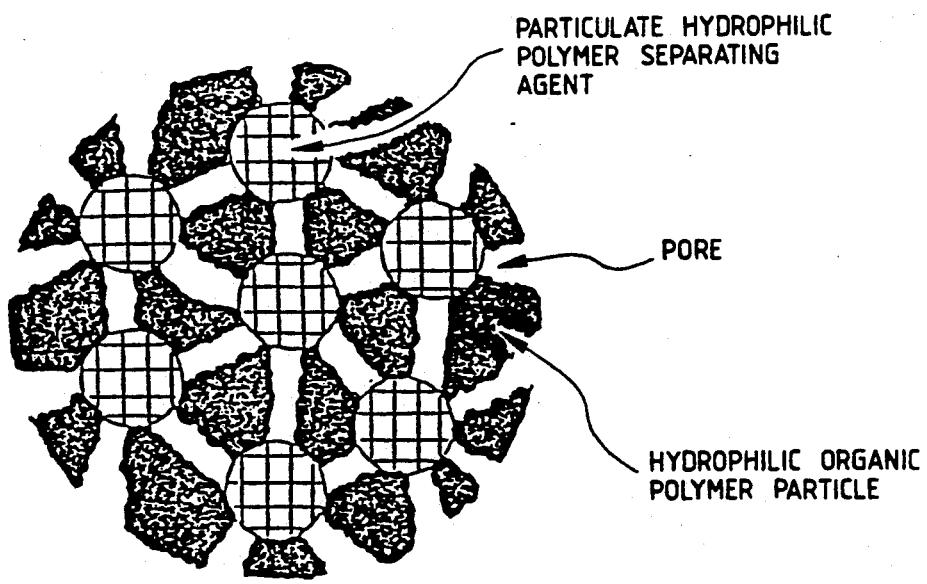
FIG. 9 shows that of the one produced by the process (B).

FIGS. 6 and 7 show each a schematic representation of the composite separating agent of the present invention produced by each process.

FIG. 6 is a sectional schematic representation of the composite separating agent produced by the process (A), wherein a hydrophilic polymer separating agent having a macro-network structure is included within each pore of an organic polymer substrate having a porous structure.

FIG. 7 is a sectional schematic representation of the composite separating agent produced by the process (B), wherein a particulate hydrophilic polymer separating agent having a macro-network structure is included in a hydrophilic organic polymer particle having a porous structure.

The composite separating agent of the present invention, wherein a hydrophilic polymer separating agent showing an excellent performance in separating biopolymers such as proteins and having a macro-network structure is incorporated in the pores of an organic polymer substrate showing a high mechanical strength and having a porous structure, is hardly compacted and shows a high permeability of liquids, when packed within a column. Further it serves an excellent carrier (separating agent) in chromatographic separation of biopolymers including proteins, since it comprises the particulate hydrophilic polymer separating agent having a macro-network structure.

To further illustrate the present invention, and not by way of limitation, the following Examples and Test Examples are given.

In the following Examples and Test Examples, each degree of swelling was determined in the following manner.

Determination of degree of swelling

A resin is washed and allowed to sufficiently swell in water. Then it is introduced into a 10 ml graduated cylinder and 10 ml of the resin is precisely measured while slightly padding the bottom of the cylinder.

The resin is drained by centrifuging and then thoroughly dried up in a vacuum drier at 50° C. at 10 mmHg.

Then the weight (A) of the same is precisely measured.

Degree of swelling = 10/A (ml/g)

EXAMPLE 1

5 g of dried hydrophilic spherical porous polymer comprising 70% by weight of 2,3-dihydroxypropyl methacrylate and 30% by weight of ethylene glycol dimethacrylate (particle size: 120 μm, pore size: 3,000 Å, pore volume: 1.75 ml/g, specific surface area: 15.4 m²/g, degree of swelling in water: 4.6 ml/g-dry; and degree of crosslinking: 30% by weight) was charged in 100 ml beaker. An aqueous solution which was obtained by dissolving 4 g of dextran, 2.4 g of sodium hydroxide and 0.6 g of sodium borohydride in 24 ml of water, was added for 4 hours thereto at room temperature under stirring. Pores of said spherical porous polymer were impregnated with the solution at a room temperature for 12 hours.

Then the solution adhering to the outside of the polymer was removed by centrifuge to obtain the polymer impregnated with the dextran solution. On the other hand, a dispersing solution was prepared by charging 230 ml of toluene in a 0.5 l of three-neck flask having a stirrer and reflux condenser, and dissolving 2 g of ethyl cellulose (EC-T100, trade name of Hercules Inc.) therein. To the resulting suspension, the porous particulate impregnated with said dextran solution was dispersed and 20 ml of epichlorohydrin was added and heated to 50° C. The mixture was stirred at this temperature for 8 hours to thereby crosslink the dextran charged in the pores of the polymer.

After the completion of the reaction, the suspension was filtered to thereby separate raw composite separating agent comprising porous particles obtained and dextran from the liquor. The obtained raw composite separating agent was successively washed with toluene, ethanol and distilled water in this order to thereby give a composite separating agent.

The types and amounts of each ingredients used in the Example 1 are shown on Table 1 below.

EXAMPLE 2

The method for preparing the composite separating agent was repeated except that an average molecular weight of dextran used was changed as shown in Table 1 below.

TABLE 1

| Example | Amount of porous particulate (g) | Composition of dextran solution (g) | Composition of toluene solution | Crosslinking agent |
|---|---|---|---|---|
| 1 | 5 | Dextran*¹ 4 (MW: 153,000) NaOH 2.4 NaBH₄ 0.6 Water 24 | Toluene 230 ml Ethyl cellulose*² 2 g | Epichlorohydrin 20 ml |
| 2 | 5 | Dextran*¹ 4 (MW: 71,500) NaOH 2.4 NaBH₄ 0.6 Water 24 | Toluene 230 ml Ethyl celluloe 2 g | Epichlorohydrin 20 ml |

Remarks
*¹Produced by Sigma Chemical Companey
*²EC-T100. Trade name of Hercules Inc.

TEST EXAMPLE 1

The pressure drop of the composite separating agent as obtained in the above Example 1 was determined in the following manner.

Namely, 40 ml of the composite separating agent as obtained in Example 1, which had been sifted out a particle size of 74 to 208 $\mu$m, was packed into a glass column (i.d.: 10 mm) provided with a jacket. The height of the composite separating agent thus packed was 50 cm. The column was maintained at 25° C. by circulating water therein. A 0.05M phosphate buffer solution (pH 7.0) was passed from the top of the column at a constant flow rate of 1 to 7 m/hr. When the packed column was stabilized and the indicator of the pressure gauge provided on the top of the column showed a constant value, the pressure gauge was read and a control value, which had been determined by repeating the above procedure on a vacant column, was subtracted from the pressure value to thereby give the pressure drop $\Delta P$ (kg/cm$^2$/50 cm-bed).

The pressure drop ($\Delta P$) was determined while varying the flow rate (LV, linear velocity: m/hr). FIG. 1 shows the results. Namely, when the composite separating agent obtained in Example 1 was used, a linear relationship was observed between the $\Delta P$ and LV within the tested range of the flow rate (LV$\leq$7 m/hr). When the solution was passed at a high flow rate (LV=7 m/hr), the separating agent particles suffered from neither any deformation nor breakage.

For comparison, the above procedure was repeated except the composite separating agent obtained in Example 1 was substituted with a crosslinked agarose gel (Sepharose CL-6B trade name of Pharmacia AB) to thereby examine the relationship between $\Delta P$ and LV. Table 1 shows the result. Namely, in the case of the crosslinked agarose gel, $\Delta P$ showed a rapid increase after the LV exceeded 1 m/hr. When LV exceeded 2.5 m/hr, the eluent could not pass.

TEST EXAMPLE 2

The composite separating agents obtained in the Examples 1 and 2 and the spherical porous polymer employed in the production of the composite separating agent in Examples 1 and 2 were packed each in a glass column (10 mm (i.d.)$\times$500 mm (h)). After thoroughly washing out with water, calibration curves were formed in the following manner and thus the performance of each separating agent as a sorbent in gel filtration chromatography was evaluated.

Namely, 100 $\mu$l of a 5% (w/v) aqueous solution of dextran of a known molecular weight or 300 $\mu$l of a 2% (w/v) aqueous solution of polyethylene glycol were charged in each column and then distilled water was passed therethrough at a flow rate of 0.4 ml/min to thereby elute the dextran and polyethylene glycol.

Figure 2:
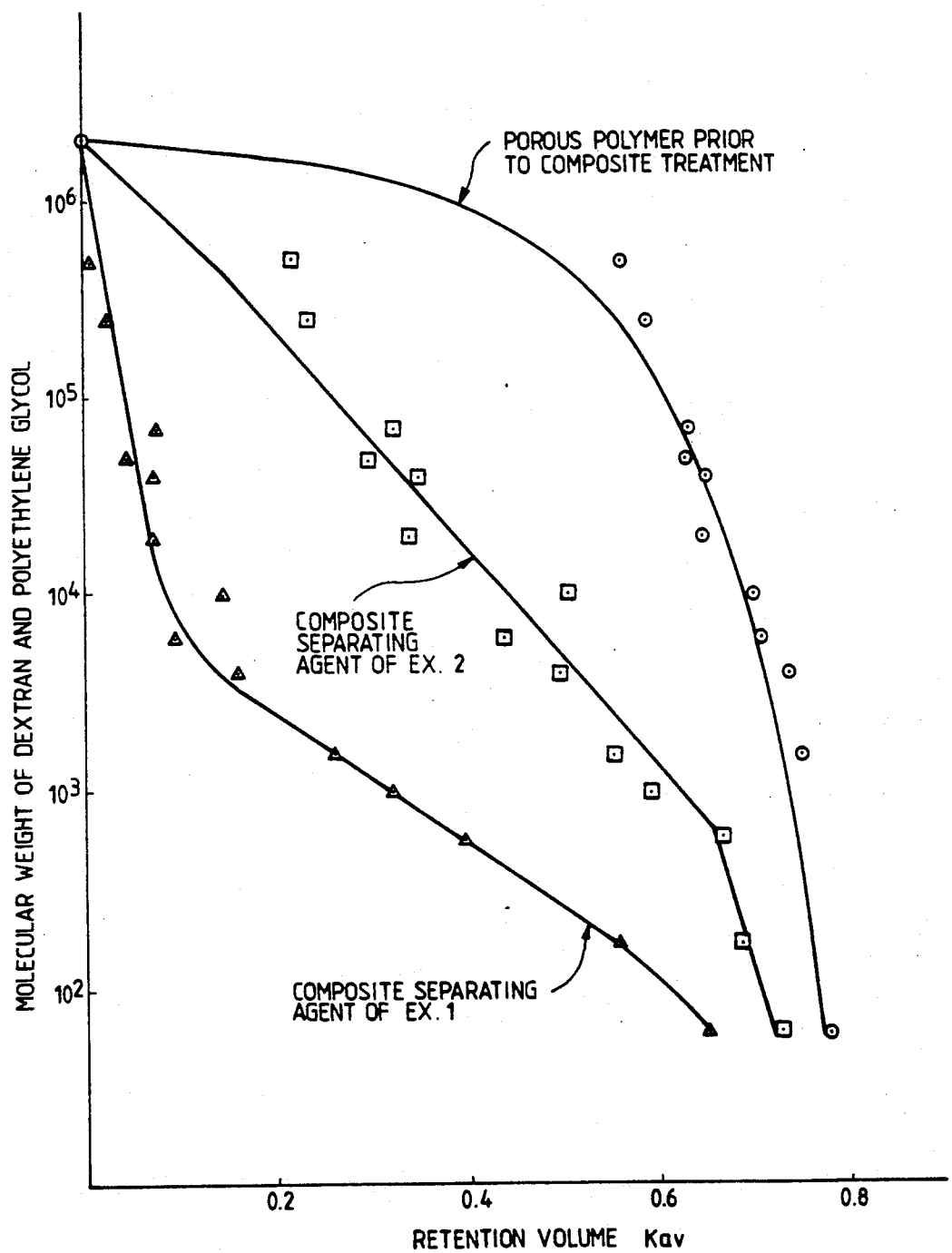
FIG. 2 shows calibration curves of dextran and polyethylene glycol for the composite separating agent of Examples 1 and 2 and the spherical porous polymer employed in the production of the same.

The dextran and polyethylene glycol in the eluate were detected with a differential refractometer. The retention volume (KaV) determined according to the following equation from the elution peak was plotted against the molecular weight to thereby give a calibration curve. FIG. 2 shows the results.

$$KaV = (Ve - Vo)/(Vt - Vo)$$

wherein Vt represents the total volume of the separating agent (ml);
Ve represents the volume of eluate (ml); and
Vo represents the exclusion volume (ml).
Vo was determined by using dextran (T2000, trade name of Pharmacia AB) of a molecular weight of approximately 2,000,000.

FIG. 2 obviously indicates that the spherical porous polymer employed in the production of the composite separating agents in Examples 1 and 2 had pores wherein dextran of a molecular weight of approximately 500,000 could be diffused. On the other hand, polyethylene glycol of a molecular weight of approximately 10,000 could not be diffused in the composite separating agent obtained in Example 1. This fact suggests that the composite separating agent obtained in Examples 1 and 2 comprised a hydrophilic polymer separating agent formed in the pores of the porous polymer substrate. The calibration curve of the composite separating agent obtained in Example 1 shows a good linearity. Thus the composite separating agent is suitable as a sorbent in gel filtration chromatography.

EXAMPLE 3

20 ml of 8 mM HCl solution was charged in a 100 ml beaker, and 2 g of powdery polyvinyl alcohol (Gosenol, produced by Nippon Synthetic Chemical Industry Co., Ltd) was added and dispersed. After heating the dispersion at 98° C. for one hour to dissolve the polyvinyl alcohol, the solution was cooled to a room temperature. To the cooled solution, 5 g of the dried porous particulate polymer used in the Example 1 was added to thereby allow the fine pores in the porous particulate polymer being impregnated with the solution at room temperature for 4 hours.

Excess amount of the solution adhered on the outer surface of the porous particulate was removed by centrifuge to obtain the porous particulates impregnated with polyvinyl alcohol solution. On the other hand, a dispersing solution was prepared by charging 150 ml of the toluene solution having the same compositions as used in the Example 1 in a 0.5 l three-neck flask equipped with a stirrer and a reflux condenser to prepare a dispersing solution. The porous particulate polymer impregnated with the polyvinyl alcohol solution was charged in the dispersing solution and dispersed. A mixture, which was separately prepared by mixing 1.84 ml of 50% glutaraldehyde as a crosslinking agent in 100 ml of the toluene solution having the same composition as used in the Example 1, was subsequently added to the dispersion and heated to 50° C. The mixture was stirred at this temperature for 4 hours to thereby crosslink the polyvinyl alcohol charged in the poros of the polymer.

After the completion of the reaction, the suspension was filtered off to thereby separate raw composite separating agent. The obtained raw composite separating agent was successively washed with toluene, ethanol and water in this order to thereby give a composite separating agent.

The types and amounts of each components employed in the Example 3 are shown on Table 2 below. In this connection, Table 3 shows a moisture content and degree of swelling in water of the composite separating agents.

EXAMPLE 4

200 mM acetic acid solution was charged in 100 ml beaker, and 2.1 g of low molecular weight chitosan shown in Table 2 was further added and dissolved at a room temperature for 2 hours under stirring. 5 g of dried porous particulate polymer used in Example 1 was added to thereby obtain a porous polymer impregnated with low molecule chitosan in the same manner as disclosed in Example 3.

A composite separating agent was prepared in the same manner as disclosed in the Example 3, except that an amount of the crosslinking agent was varied as shown in Table 2. Table 3 shows a moisture content and degree of swelling under water of the obtained composite separating agent.

TABLE 2

| Example | Composition of solution to be impregnated | Crosslinking agent | Amount of crosslinking agent |
|---|---|---|---|
| 3 | Polyvinyl alcohol*[1] 2 g 8 mM-Hcl 20 ml | 50% aqueous glutaraldehyde solution | 1.84 ml |
| 4 | Low molecule chitosan*[2] 2.1 g 200 M-acetic acid 300 ml | 50% aqueous glutaraldehyde solution | 2.30 ml |

Remarks
*[1] Gosenol, trade name, produced by Nippon Synthetic Chemical Industry Co., Ltd.
*[2] Low Molecule weight chitosan prepared by adding 20 g of the Chitosan 100, trade name, produced by Nakarai Chemical and Pharmaceutical Co., Ltd., in an aqueous solution obtained by solving 8.5 g of sodium perborate with 500 ml of water, and heat-treating the solution at 50° C. for 3 hours.

TABLE 3

| | Moisture content (%) | Degree of Swelling (ml/g) |
|---|---|---|
| Porous copolymer prior to composite treatment | 68 | 4.6 |
| Composite separating agent obtained in Example 3 | 57 | 3.3 |
| Composite separating agent obtained in Example 4 | 58 | 3.4 |

TEST EXAMPLE 3

Figure 3:
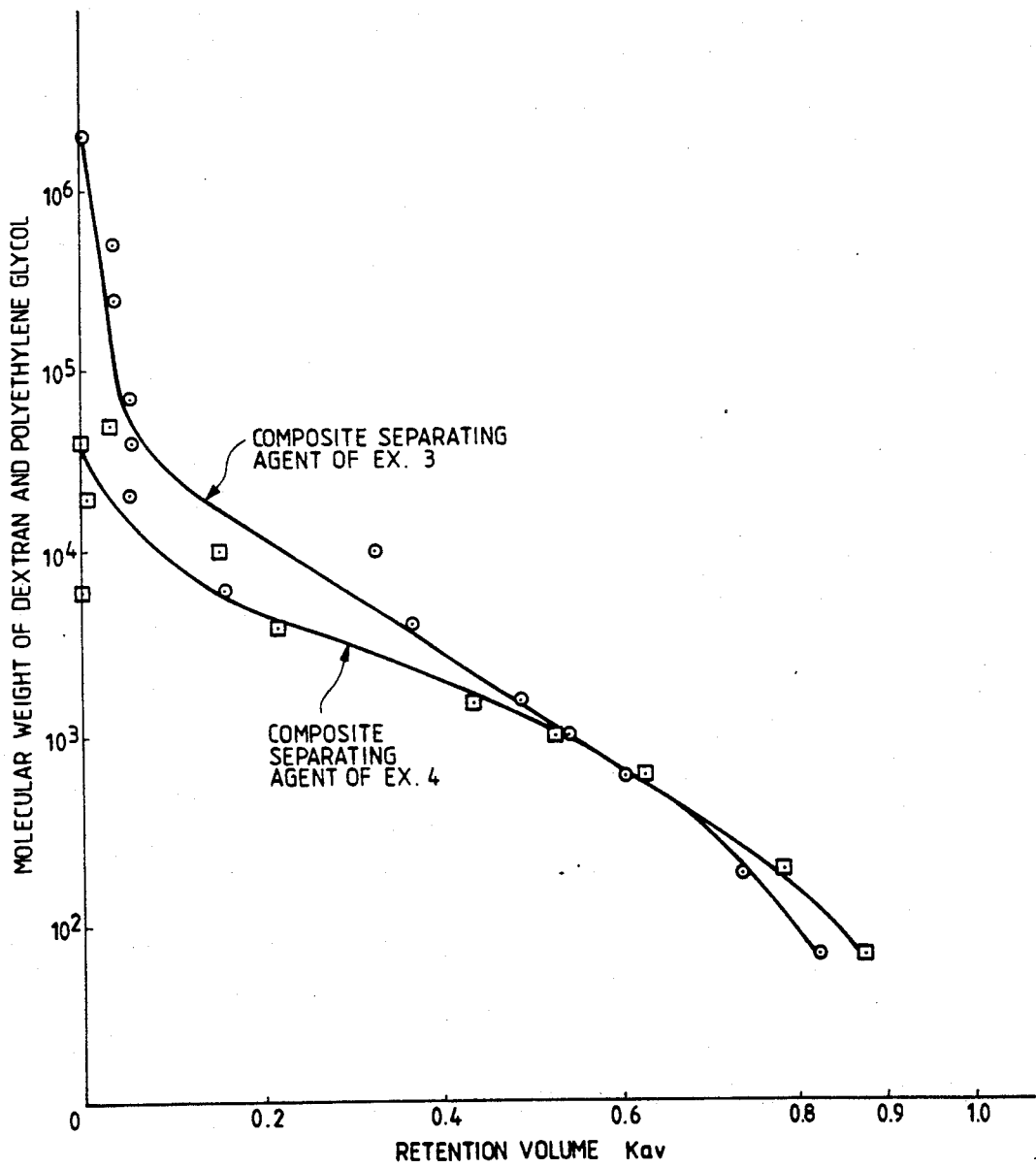
FIGS. 3 and 4 similarly show calibration curves of dextran and polyethylene glycol for the composite separating agent according to Examples 3 and 4, and Examples 5, 6 and 7, respectively.

The composite separating agents obtained in Examples 3 and 4 were tested in the same manner as in Test Example 2 to thereby give a calibration curve as FIG. 3.

As clearly seen from FIG. 3, the composite separating agents obtained in Examples 3 and 4 cannot disperse a dextran having a molecular weight of several ten thousands or polyethylene glycol. On the other hand, the spherical polous particulate polymer used in the method of Examples 3 and 4, have fine pores, into which a dextran having a molecular weight of about 500,000 may be dispersed. Thus, it is believed that the composite separating agent obtained by the method of Examples 3 and 4 forms hydrophilic polymeric separating agents in the fine pores of porous polymer substrate. In consideration of the fact that the calibration curve in FIGS. 2 and 3 shows excellent linearity, the porous polymer can be used as excellent sorbent for gel filtration chromatography.

EXAMPLE 5

7.0 g of dried spherical porous polymer (A) comprising styrene, ethylvinylbenzene, and divinylbenzene was impregnated with methanol and the methanol was gradually replaced with water to thereby form a swollen state with water. An excess amount of water which was adhered over the surface of the porous polymer which was in swollen state with water was filtered off by means of suction.

Separately, 40 ml of 3N-sodium hydroxide solution was charged in 0.2 l three neck distillation flask equipped with stirrer and reflux condenser, and 8 g of dextran was subsequently added thereto at a room temperature for 4 hours under stirring, and dissolved. The porous polymer above was added in the solution and the fine pore of the polymer was inpregnated with the dextran solution at a room temperature for 12 hours under stirring.

Then, 3.9 ml of epichlorohydrin was added under stirring, and heated to 50° C. The mixture was stirred at this temperature for 8 hours to thereby crosslink the dextran charged in the pores of the porous substrate.

After the completion of the reaction, the products was transfered to a beaker containing 200 ml of water, and the aqueous solution was neutralized with 1N-hydrochloric acid solution. A raw composite separating agent was fillered off and was subsequently washed with water to thereby give a composite separating agent.

A moisture content and degree of swelling in water of the obtained composite separating agent are shown on Table 6 below. As a comparison, the properties of the porous polymer (A) prior to composite treatment are also shown in Table 6.

The physical preperties of the spherical porous polymer (A) used, and types and amounts of each ingredients used in the Example 5 are shown on Tables 4 and 5, respectively.

EXAMPLE 6

A composite separating agent was, prepared in the same manner as disclosed in the Example 5, except that a composition of dextran solution and an amount of epichlorohydrin were changed to those stated in Table 5.

A moisture content and a degree of swelling in water of the composite separating agent obtained are shown on Table 6.

EXAMPLE 7

A composite separating agent was prepared in the same manner as disclosed in the Example 5, except that the spherical porous polymer used was changed to a polymer (B).

The physical properties of the spherical porous polymer (B) used and a moisture content and a degree of swelling in water of the composite separating agent obtained are shown on Tables 4 and 6, respectively.

TABLE 4

| Porous polymer | Composition (wt %) | | Average Pore volume (mol/g) | pore radius (Å) | Surface area (m²g) |
|---|---|---|---|---|---|
| A | Ethylvinylbenzene | 39 | 0.9954 | 735 | 401.80 |
| | Styrene | 11 | | | |
| | Divinylbenzene | 50 | | | |
| B | Ethylvinylbenzene | 43 | 1.6410 | 5076 | 631.90 |
| | Styrene | 2 | | | |
| | Divinylbenzene | 53 | | | |

TABLE 5

| Example | Porous polymer used | Method for removing excess water | Composition of dextran solution | | An amount of epichlorohydrin (ml) |
|---|---|---|---|---|---|
| 5 | A | Suction filtration | Dextran*[1] 3N-NaOH | 8 g 40 ml | 3.9 |

TABLE 5-continued

| Example | Porous polymer used | Method for removing excess water | Composition of dextran solution | | An amount of epichlorohydrin (ml) |
| --- | --- | --- | --- | --- | --- |
| 6 | A | Centrifuge | Dextran*1 1.25N-NaOH | 8 g 40 ml | 1 |
| 7 | A | Centrifuge | Dextran*1 3N-NaOH | 8 g 40 ml | 3.9 |

Remarks
*1 Produced by Sigma Chemical Company. Average molecular weight: 71,500.

TABLE 6

| | Moisture content (%) | Degree of swelling (ml/g-dry) |
| --- | --- | --- |
| Example 5 | 46.0 | 2.7 |
| Example 6 | 46.2 | 2.9 |
| Porous polymer A | 50.4 | 3.2 |
| Example 7 | 55.5 | 3.4 |
| Porous polymer B | 61.3 | 4.1 |

TEST EXAMPLE 4

Figure 4:
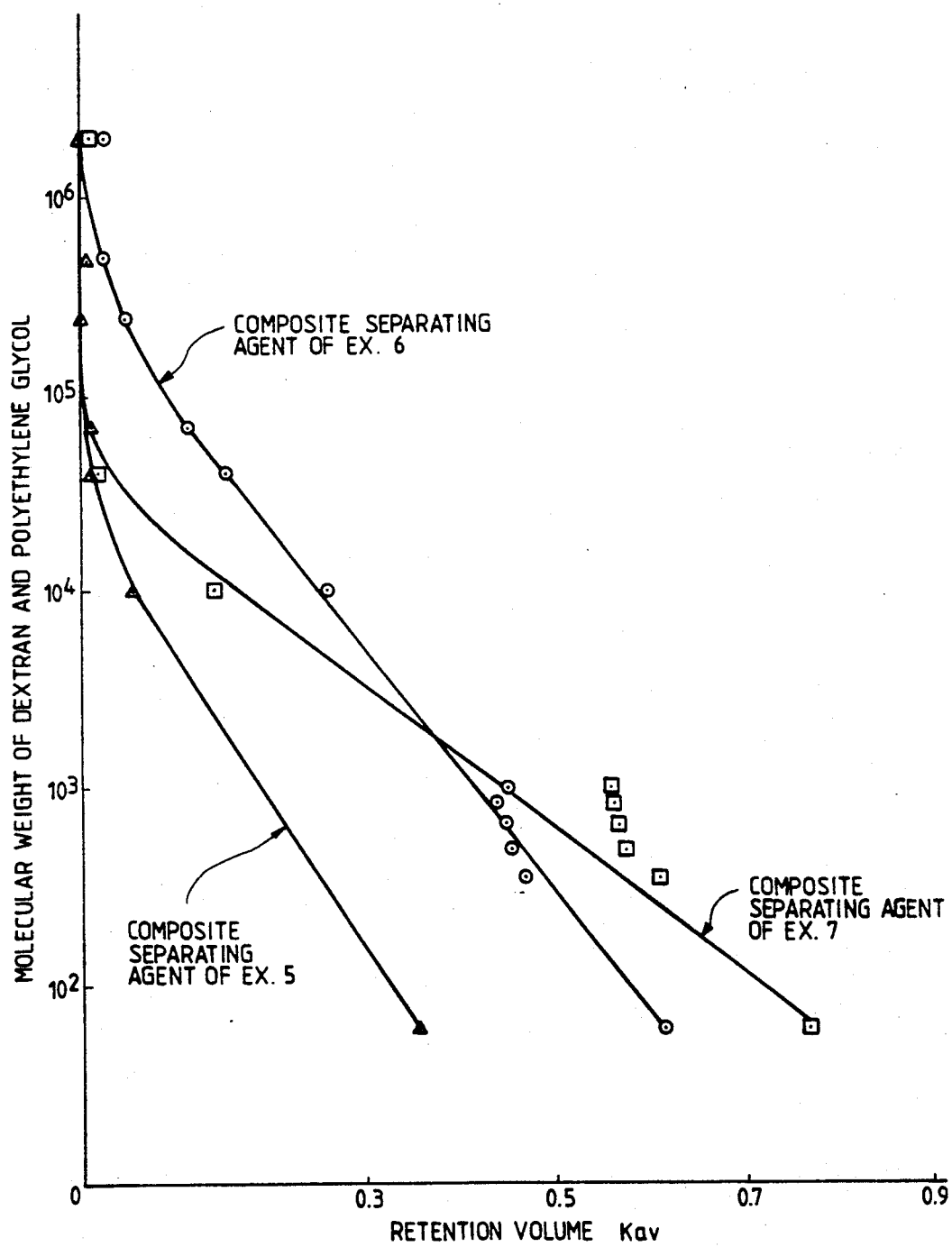

The composite separating agent obtained in Examples 5, 6 and 7 was tested in the same manner as of the Test Example 2 to thereby give a calibration curve, shown as FIG. 4.

Since the spherical porous polymers employed in the Examples 5, 6 and 7 absorb dextran and polyethylene glycol, the porous polymer cannot be used as a sorbent for gel filtration chromatography of dextran and polyethylene glycol. However, on treating thereof so as to give a composite, the composite separating agent thus obtained shows no absorption of dextran and gives an excellent calibration curve as FIG. 4. Thus, the composite separating agent can be used as a sorbent for gel filtration chromatography for dextran having various molecular weight, oligomaltose and the like.

TEST EXAMPLE 5

The composite separating agent obtained in the Example 5 and as a comparison, a spherical porous polymer (A) prior to composite treatment, were investigated in absorption of a cattle serum albumin according to the process as mentioned below.

100 ml of buffer solution (pH 7.50) containing 0.20 weight % cattle serum albumin and 0.50M trishydrochloric acid was prepared.

Separately, 500 ml of each separating agent was buffered with a buffer solution and excessively adhered water over the agent was removed by centrifuge. The separating agent thus treated was added to the solution prepared above.

The mixture was allowed to stand at 5° C. for 12 hours, and shaked at 10° C. for 6 hours in a shaking machine (100 RPM, 4 cm of stroke). After completion of the shaking, the mixture was filtered. The absorbance of the filtrate was determined at 280 nm to thereby calcurate an amount of absorbed protein with the separating agent from the calcuration curve. The results are shown on Table 7.

TABLE 7

| | Absorbed amount of cattle serum albumin (g/l-R) |
| --- | --- |
| Composite separating agent of Example 5 | 0 |
| Porous polymer (A) prior to composite treatment | 8.9 |

EXAMPLE 8

250 ml of dichloroethane was introduced into a 0.5 l three neck flask provided with a stirrer and a reflux condenser. 0.5 g cellulose acetate butyrate (CAB 381-20, trade name of Eastman-Kodak Co.) was dissolved therein to thereby give a dispersion bath.

Separately, 5 g of sodium chloride and 50 ml of water were introduced into a 200 ml three neck flask provided with a stirrer and a reflux condenser and stirred therein to thereby dissolve the sodium chloride. Then 2.5 g of powdery polyvinyl alcohol (Gosenol NL-05, trade name of Nippon Gosei Kagaku Kogyo K.K.) was dispersed therein and dissolved by heating to 98° C. for an hour. Then 6 ml of a 5N aqueous solution of sodium hydroxide was further added thereto and the resulting mixture was cooled to room temperature.

Separately, 5 g of a commercially available crosslinked dextran separating agent having a giant network structure (Sephadex G50 (Medium), trade name of Pharmacia AB, having a degree of swelling in water of 10 ml/g-dry) was dispersed in an aqueous sodium chloride solution, which had been prepared by dissolving 5 g of sodium chloride in 50 ml of water, in a 200 ml three neck flask provided with a stirrer and a reflux condenser. Then the resulting dispersion mixture which had been heated to 98° C. for an hour to thereby allow the dextran separating agent to swell and then cooled to room temperature, was added to the abovementioned polyvinyl alcohol solution, and dispersed therein under stirring.

The obtained dispersion was dispersed in the abovementioned dichloroethane dispersion bath and stirred thereof to give spheres. After allowing to stand at room temperature for 19 hours under stirring, the spherical drops were allowed to spontaneously set to gel.

After the completion of the spontaneous gelation, 100 ml of a 25% by weight aqueous sodium chloride solution was further added. The resulting mixture was allowed to stand for 5 hours under stirring, filtered and successively washed with acetone, methanol and water in this order. The spherical gel product thus obtained was transferred into a 500 ml three neck flask provided with a stirrer. After adding 40 g of sodium chloride and 200 ml of water, 1.4 ml of a 25% by weight aqueous solution of glutaraldehyde was further added thereto under stirring. Then 4 ml of 5N hydrochloric acid was further added thereto. The obtained mixture was thus crosslinked at 65° C. for 2 hours under stirring. Then the mixture was cooled to room temperature, filtered and thoroughly washed out with water. Thus a spherical polyvinyl alcohol particulate composite separating agent in a milky white color, which showed an average particle size of 700 μm and involved 16 particles, in average, of the crosslinked dextran separating agent having an average particle size of 220 μm in each pore, was obtained.

The crosslinked polyvinyl alcohol moiety of the composite separating agent showed a degree of swelling in water of 12 ml/g-dry and a degree of crosslinking of 25% by mol.

Table 8 summarizes the type and amount of each commercially available crosslinked dextran separating agent, those of polyvinyl alcohol and the amount of sodium hydroxide.

EXAMPLE 9

The procedure of Example 8 was repeated except that the commercially available crosslinked dextran separating agent used in Example 8 was substituted with 3 g of another commercially available dextran separating agent (Sephadex G100 (medium):, trade name of Pharmacia AB, degree of swelling in water: 18 ml/g-dry). Thus a spherical crosslinked polyvinylalcohol particulate composite separating agent in a milky white color, which showed an average particle size of 700 μm and involved 18 particles, in average, of the crosslinked dextran separating agent particles of an average particle size of 210 μm in each pore, was obtained.

The crosslinked polyvinyl alcohol moiety of the composite separating agent showed a degree of swelling in water of 12 ml/g-dry and a degree of crosslinking of 25% by mol.

The type and amount of each component employed in Example 9 are shown in Table 8.

EXAMPLE 10

10 g of sodium chloride and 100 ml of water were added to a 200 ml three-neck flask provided with a stirrer and a reflux condenser. The obtained mixture was stirred to thereby dissolve the sodium chloride in the water. Then 3.5 g powdery polyvinyl alcohol (Gosenol NH-18: trade name of Nippon Synthetic Chemical Industry Co., Ltd.) and 2.5 g of a commercially available crosslinked dextran separating agent (Sephadex G150 (SF); trade name of Pharmacia AB, degree of swelling in water: 20 ml/g-dry) were dispersed therein. The obtained mixture was heated to 98° C. for three hours, thus dissolving the polyvinyl alcohol and allowing the crosslinked dextran separating agent to swell. Subsequently 4 ml of 5N aqueous solution of sodium hydroxide was added thereto and the resulting mixture was stirred.

Then the mixture was cooled to room temperature and dispersed and stirred to give spheres in an organic solvent in the same manner as the one described in Example 3 except that the amount of the cellulose acetate butyrate to be added was increased to 1.25 g. After allowing to stand at room temperature for 19 hours under stirring, the spherical drops were allowed spontaneously to set to gel.

After the completion of the spontaneous gelation, 100 ml of a 20% by weight aqueous solution of sodium chloride was further added. The obtained mixture was stirred for 5 hours, allowed to stand, filtered and then successively washed with acetone, methanol and water in this order.

The spherical gel product thus obtained was transferred into a 300 ml three-neck flask provided with a stirrer and 80 ml of water was added thereto. The mixture was stirred under cooling while 72 g of sodium hydroxide was added thereto and dissolved therein. Then 38 ml of epichlorohydrin was added and the resulting mixture was crosslinked by heating to 60° C. for 6 hours under stirring. Then the mixture was cooled to room temperature, filtered, thoroughly washed out with water and then crosslinked again under the same conditions as those described above. It was cooled to room temperature, filtered and thoroughly washed with water to thereby give a composite separating agent.

The composite separating agent thus obtained was a spherical crosslinked polyvinyl alcohol particulate separating agent in a pale yellow color, which showed an average particle size of 350 μm and involved 70 particles, in average, of the crosslinked dextran separating agent having an average particle size of 68 μm in each pore. The crosslinked polyvinyl alcohol moiety of the composite separating agent showed a degree of swelling in water of 8 ml/g-dry and a degree of crosslinking of approximately 15% by mol.

The type and amount of each component employed in the Example 10 are shown in Table 8.

EXAMPLE 11

The procedure of Example 10 was repeated except that the type and amount of the polyvinyl alcohol to be used were altered as shown in Table 8. Thus a composite separating agent was produced.

The composite separating agent thus obtained was a spherical crosslinked polyvinyl alcohol particulate composite separating agent in a pale yellow color, which showed an average particle size of 350 μm and involved 70 particles, in average, of the crosslinked dextran separating agent having an average particle size of 68 μm in each pore.

The crosslinked polyvinyl alcohol moiety of the composite separating agent showed a degree of swelling in water of 10 ml/g-dry and a degree of crosslinking of approximately 20% by mol.

The type and amount of each component employed in Example 11 are shown in Table 8.

TABLE 8

|  | Ex. 8 | Ex. 9 | Ex. 10 | Ex. 11 |
| --- | --- | --- | --- | --- |
| Crosslinked dextran separating agent: | | | | |
| type* | G50 (M) | G100 (M) | G150 (SF) | G150 (SF) |
| (g) | 5 | 3 | 2.5 | 2.5 |
| Polyvinyl alcohol: | | | | |
| type** | NL-05 | NL-05 | NL-18 | NL-05 |
| (g) | 2.5 | 2.5 | 3.5 | 5 |
| 5N NaOH aq. sln.: (ml) | 6 | 6 | 4 | 3 |

Note
*Sephadex, trade name of Pharmacia AB.
**Gosenol, trade name of Nippon Synthetic Chemical Industry Co., Ltd.

TEST EXAMPLE 6

The composite separating agent obtained in Example 11 was subjected to the examination of pressure drop in the same manner as the one described in Test Example 1.

The procedure of Test Example 1 was repeated except that the particle size of the composite separating agent was sifted out 149 to 297 μm prior to packing to thereby determine the pressure drop ($\Delta P$: kg/cm$^2$/50 cm-bed).

Figure 5:
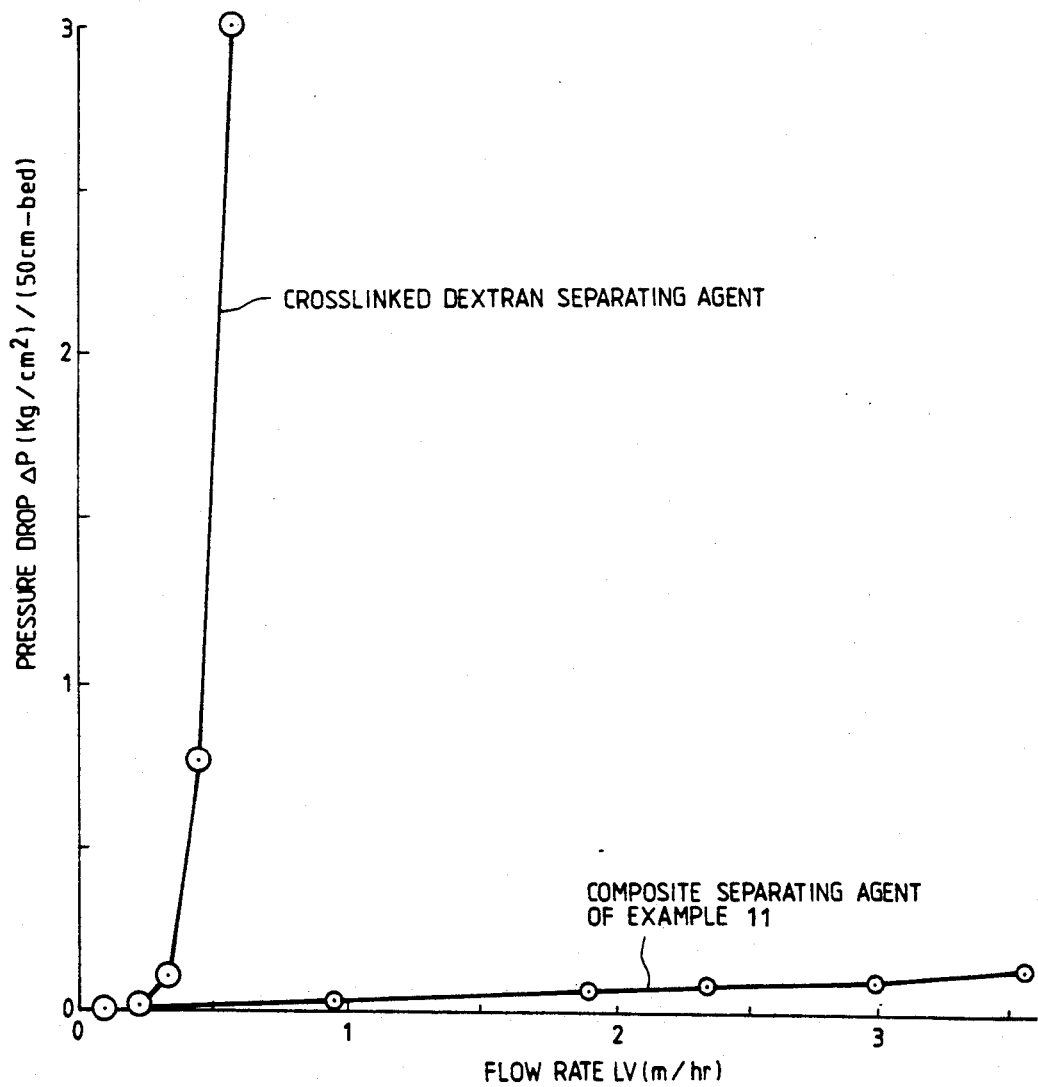
FIG. 5 shows the relationships between the pressure drop P and flow rate LV observed when the composite separating agent of Example 11 and a crosslinked dextran separating agent, which is employed for comparison, are packed each in a column.

The pressure drop ($\Delta P$) was determined while varying the flow rate (LV: line flow rate (m/hr). FIG. 5 shows the results. Namely, when the composite separating agent obtained in Example 11 was employed, a linear relationship was observed between the $\Delta P$ and LV within the tested flow rate (LV) range and the separating agent particles suffered from neither and deformation nor breakage even at a high flow rate (LV=3 m/hr).

For comparison, the above procedure was repeated except the composite separating agent obtained in Example 11 was substituted with the crosslinked dextran separating agent Sephadex G150 (M), trade name of Pharmacia AB, which was used in Example 11 as a starting material to thereby examine the relationship between $\Delta P$ and LV. FIG. 5 shows the result. Namely, $\Delta P$ showed a rapid increase when the flow rate (LV) exceeded 0.3 m/hr. When LV exceeded 0.6 m/hr, the liquid permeation became difficult.

TEST EXAMPLE 7

The composite separating agents obtained in Example 8 and Example 9 were packed each in a glass column (10 mm i.d.×500 mm h) and thoroughly washed with water. Then the calibration curve of each composite separating agent was formed according to the procedure as described in Test Example 2. Thus the performance of each composite separating agent as a carrier in gel filtration chromatography was evaluated.

Namely, the effluent volume (l/l-R) determined from the elution volume was plotted against the molecular weight to thereby give a calibration curve, shown as FIG. 6.

The calibration curves of the composite separating agents obtained in Examples 8 and 9 showed each the gel filtration performance of the corresponding crosslinked dextran separating agent involved therein. Each calibration curve showed a good linearity, suggesting that the composite separating agent is suitable as a sorbent in gel filtration chromatography.

TEST EXAMPLE 8

The composite separating agents obtained in Examples 5 and 6 were packed each in a glass column (8.2 mm i.d.×500 mm h) and throughly equilibrated with a 50 mM phosphate buffer (pH 7.40) containing 150 mM of NaCl. Then calibration curves of proteins were formed in the following manner to thereby evaluate the composite separating agent as a sorbent in gel filtration chromatography.

Namely, each of proteins as shown in the following Table, which were different from each other in molecular weight, was dissolved in a 50 mM phosphate buffer (pH 7.40) containing 150 mM of sodium chloride to thereby obtain 0.1% aqueous protein solution. 150 μl of the protein solution was charged in the abovementioned column. Then a 50 mM phosphate buffer containing 150 mM of NaCl was passed therethrough at a flow rate of 0.2 ml/min to thereby elute the protein. The protein was detected with an UV meter at 280 nm.

For comparison, the above procedure was repeated except that the composite separating agent obtained in Example 10 or 11 was substituted with the crosslinked dextran separating agent Sephadex G150 (M), trade name of Pharmacia AB, which was employed in the corresponding Example, to thereby form calibration curves of the proteins.

Each calibration curve was formed by determining the retention volume $K_{aV}$ from the elution peak of each protein and then plotting the obtained data against the molecular weight. FIG. 7 shows the results.

| No. in FIG. 3 | Employed proteins Protein | M.W. (×10³) | Isoelectric point |
|---|---|---|---|
| 1 | thyroglobulin | 667 | 4.5 |
| 2 | ferritin | 440 | 4–5 |
| 3 | bovine serum γ-globulin | 159 | 5.8–7.3 |
| 4 | bovine serum albumin | 66.3 | 4.6–4.8 |
| 5 | egg albumin | 45 | 4.6 |
| 6 | myoglobin | 17.8 | 8.1–8.2 |

FIG. 7 obviously indicates that the calibration curves of the composite separating agents of Examples 10 and 11 show each a good linearity.

While the invention has been described in detail and with reference to specific embodiments thereof, it will be apparent to one skilled in the art that various changes and modifications can be made therein without departing from the spirit and scope thereof.

What is claimed is:

1. A composite separating agent for aqueous gel permeation chromatography which comprises a crosslinked polysaccharide hydrophilic polymer separating agent incorporated within pores of an organic polymer substrate;
   wherein said separating agent shows a degree of swelling in water of 10 to 100 ml/g-dry, and has a macro-network structure, each pore of said substrate having a pore volume of 0.5 to 3 ml/g and a pore radius of 200 to 100,000 Å; and
   said substrate shows a degree of swelling in water of 20 ml/g-dry or below and a degree of crosslinking of 4 to 100 mol %, has a porous structure, and is a copolymer of a monounsaturated monomer and a polyunsaturated monomer;
   wherein said monounsaturated monomer is selected from the group consisting of styrene, ethylvinylbenzene, p-methyl styrene, glycidyl methacrylate, allyl glycidyl ether, acryl glycidyl ether, 2-hydroxyethyl methacrylate, polyethyleneglycol methacrylate, methacrylic acid, methyl methacrylate, vinyl formate, vinyl acetate, allyl formate, and allyl acetate; and said polyunsaturated monomer is selected from the group consisting of divinyl benzene, trivinyl benzene, and substituted derivatives thereof, ethylene glycol dimethacrylate, polyethylene glycol dimethacrylate, propylene glycol dimethacrylate, polypropylene glycol dimethacrylate, glycerol trimethacrylate, glycerol dimethacrylate, and triallyl isocyanurate.

2. The composite separating agent of claim 1 wherein said separating agent is crosslinked dextran agarose or chitosan.

3. The composite separating agent claimed in claim 1 wherein said separating agent is crosslinked dextran.

4. The composite separating agent of claim 3 wherein said separating agent is dextran crosslinked by a crosslinking agent selected from the group consisting of epichlorohydrin, glutaraldehyde, and methylene diisocyanate.

5. The composite separating agent of claim 1 wherein said separating agent is crosslinked chitosan.

6. The composite separating agent of claim 5 wherein said separating agent is chitosan crosslinked by a crosslinking agent selected from the group consisting of epichlorohydrin, glutaraldehyde, methylene diisocyanate, and 1,8-dichlorooctane.

7. The composite separating agent of claim 1 wherein said substrate is a copolymer of glycidyl methacrylate and ethylene glycol dimethacrylate, or a copolymer of styrene, ethylvinylbenzene, and vinyl benzene.

* * * * *